United States Patent Office 2,864,854
Patented Dec. 16, 1958

2,864,854

DECARBOXYLATION OF TRIMELLITIC ACID

Art C. McKinnis, Long Beach, Calif., assignor to Union Oil Company of California, Los Angeles, Calif., a corporation of California No Drawing. Application December 28, 1953
Serial No. 400,777

13 Claims. (Cl. 260—475)

This invention relates to methods for effecting mono-decarboxylation of trimellitic acid (benzene 1,2,4-tricarboxylic acid) to form corresponding dibasic acids. More specifically, the invention concerns methods which selectively remove the 2-carboxyl group whereby a product is obtained which is predominantly terephthalic acid (benzene 1,4-dicarboxylic acid). The methods employed comprise essentially the heating of trimellitic acid in the presence of mercuric chloride, or other mercuric salts. This procedure is found to yield a dibasic acid product which is predominantly terephthalic acid, with only minor proportions of isophthalic acid, and substantially no ortho-phthalic acid.

The aromatic dicarboxylic acids, particularly terephthalic acid, have recently become highly important commercial materials by virtue of their use in the manufacture of polymeric esters such as Dacron. In the past, terephthalic acid has generally been manufactured by the controlled oxidation of pure para-xylene. This oxidation is generally performed in two separate stages, the first stage involving low temperature catalytic oxidation to para-toluic acid, and the second stage involving a higher temperature, liquid phase, non-catalytic oxidation of the toluic acid to terephthalic acid. This process is economically undesirable in that it requires as the starting material substantially pure para-xylene.

Alternatively, a mixture of isomeric xylenes may be similarly oxidized to produce a mixture of the corresponding dibasic acids, i. e. ortho-phthalic, isophthalic and terephthalic acids. Usually the product is also contaminated with benzoic acid and/or toluic acids. Benzoic, toluic and ortho-phthalic acids are easily separated by solvent extraction, or by other methods. However the separation of the remaining isophthalic acid from the terephthalic acid is more difficult and expensive. Selective solvent extraction involves the inherent disadvantage that the acids are only slightly soluble in most solvents. Fractional crystallization is also impractical because the acids tend to sublime. The chemical properties of the two acids are almost identical so that selective chemical action is generally uneconomical.

The present invention takes an entirely different approach to the production of terephthalic acid. The trimellitic acid employed as starting material may be readily obtained by the oxidation of 1,2,4-trimethyl benzene (pseudocumene), or other 1,2,4-trialkyl benzenes. Pseudocumene, the principal raw material, may be readily separated by fractional distillation from the C-9 aromatic fraction obtained for example from the catalytic reforming or hydroforming of cracked and/or straight-run gasoline fractions. The use of 1,2,4-trialkyl benzenes provides a much more economical, plentiful, and versatile source of raw materials.

The primary object of this invention is therefore to provide more economical sources of raw material for the production of terephthalic acid. A more specific object is to provide economical methods for the mono-decarboxylation of trimellitic acid to form selectively terephthalic acid in preference to the other isomeric acids. A still further object is to provide a cyclic decarboxylation process wherein essentially all of the reagents may be recovered and recycled. Still further objects include the provision of techniques and solvent media for the process which will reduce corrosivity, heat requirements, and reaction time to practical minimum values. Still another object is to provide a decarboxylation method which permits the inter-stage separation of terephthalic acid precursors from isophthalic acid precursors, thereby further improving the purity of the terephthalic acid produced. Still another object is to provide suitable methods whereby the dicarboxylic acids produced may be obtained either as free acids, or as the esters thereof. Other objects and advantages will be apparent to those skilled in the art from the more detailed description which follows.

Very little is apparently known about the decarboxylation of trimellitic acid. It is known generally that polycarboxylic aromatic acids which contain ortho-carboxyl groups may be decarboxylated under the influence of heat and/or catalysts to remove one of the ortho-carboxyl groups. Ortho-phthalic acid and hemimellitic acid (1,2,3-benzene tricarboxylic acid) for example may be mono-decarboxylated to produce respectively benzoic acid and isophthalic acid. Insofar as I am aware however, no decarboxylation methods are now known for producing terephthalic acid from higher carboxylated acids, nor for mono-decarboxylating trimellitic acid.

Considering trimellitic acid as a raw material, it would appear that the mono-decarboxylation thereof would probably yield isophthalic acid, terephthalic acid, or a mixture thereof, and possibly some ortho-phthalic acid if water is not present to prevent the formation of the anhydride between the two ortho-carboxyl groups. After extensive experimentation and the consideration of many methods which actually gave predominantly isophthalic acid, or mixtures containing at most about 40% terephthalic acid, the present method was discovered which commonly results in the production of a mixture consisting of at least about 75 mole percent of terephthalic acid and about 25 mole percent isophthalic acid. By suitably modifying the last step of the process, one or both of the corresponding esters may be obtained instead of the acids.

The process herein described may be divided somewhat arbitrarily into two stages. In the first stage the trimellitic acid is heated in the presence of water at a temperature between about 100° and 350° C. with e. g. 0.1 to 2.0 mole-proportions of mercuric chloride, or other mercuric salt. The preferred temperature range is between about 175° and 300° C., and the preferred mole-ratio of mercuric chloride is between about 0.4 and 1.0. A variety of solvents or dispersing media may be employed in the first stage. During the heating carbon dioxide and HCl are evolved. The first stage may be considered complete when no more $CO_2$ is evolved. At the stated temperatures, the reaction is usually complete in from 1 to 5 hours. The product is apparently a mixture of anhydro-hydroxymercuri-terephthalic acid, anhydro-4-hydroxymercuri-isophthalic acid, chloromercuri-terephthalic acid, and 4-chloromercuri-isophthalic acid. The exact nature of the intermediate product is not known with certainty but in any event it is found that the mercuri derivatives of isophthalic acid present therein are more soluble in water and alcohols than are the corresponding mercuri derivatives of terephthalic acid. Hence the inslouble terephthalic acid-mercuri derivatives may largely be separated from the isophthalic derivatives at this stage of the process, as by filtration, centrifuging, etc.

The segregated terephthalic acid intermediates may then be separately treated in the second stage to produce substantially pure terephthalic acid, and the segregated isophthalic derivatives may be likewise treated in a second stage to produce relatively pure isophthalic acid. Alternatively, the complete reaction mixture from the first stage may be treated in the second stage to obtain a mixture of isophthalic and terephthalic acids wherein the terephthalic acid predominates.

In the second stage of the process the reaction products from the first stage are treated with an excess of hydrogen chloride whereby the anhydro-hydroxymercuri compounds and/or the chloromercuri compounds are decomposed to form the corresponding dibasic acids and mercuric chloride. This second step in the process may be carried out in a dispersing media such as water wherein the reactants and the products are largely insoluble. In this case high temperatures and pressures are required in order to obtain a reasonable reaction rate. Temperatures in the order of 100° to 300° C. for example may be employed, in which case the reaction will be complete in about 1–5 hours. Lower temperatures may be employed, in which case the reaction time is lengthened to e. g. 12–24 hours. Large molar excesses of HCl are preferable, for example from about 4–50 moles per mole of dicarboxylic acid. Alternatively a solvent may be employed in which the reactants are appreciably soluble, in which case lower temperatures, e. g. 25°–100° C. may be employed. Such solvents include for example methanol or ethanol saturated with dry HCl. With such solvents as these, the second stage of the reaction will go to completion in 5–30 minutes at 60° C. for example. In this case also the esters are simultaneously formed during the demercurization step. The demercurization may be termed a hydrochlorinolysis step.

While the precise reaction mechanism taking place in each of the stages is not known with certainty, it appears from the experimental evidence at hand that the most logical mechanism may be summarized by the following equations:

(I) 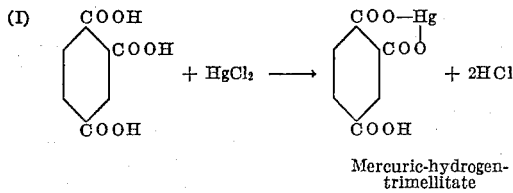

Mercuric-hydrogen-trimellitate (II) 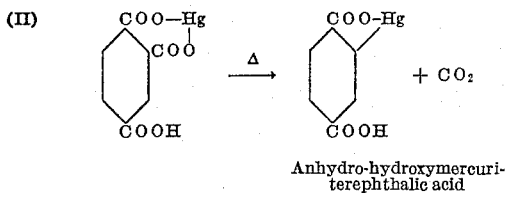

Anhydro-hydroxymercuri-terephthalic acid (IIa) 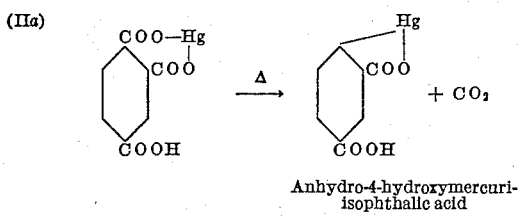

Anhydro-4-hydroxymercuri-isophthalic acid (III) 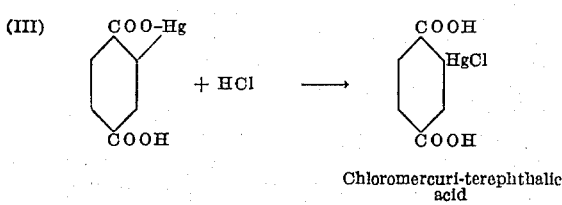

Chloromercuri-terephthalic acid (IIIa) 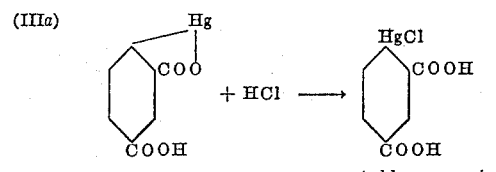

4-chloromercuri-isophthalic acid (IV) 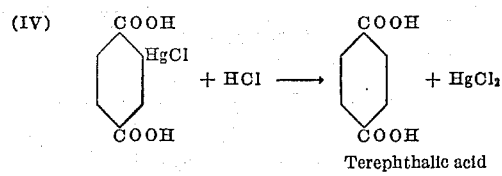

Terephthalic acid (IVa) 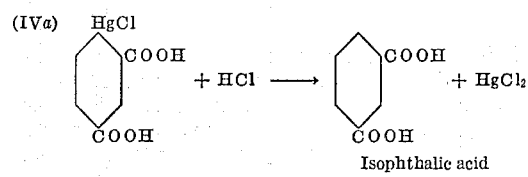

Isophthalic acid

Reactions I, II, IIa and perhaps III and IIIa take place in the first stage of the reaction, whereas reactions IV and IVa and possibly III and IIIa are thought to take place in the second stage. The above equations however are set forth merely for elucidation, and it should not be considered that the invention is limited to the exact mechanism set forth.

The solvents or dispersing media which may be employed in the first stage of the process may consist of any suitably inert material in which trimellitic acid and mercuric chloride are appreciably soluble. Suitable solvents include for example water, alcohols, glycols, alkanol amines, dialkanol amines, aliphatic sulfones, and in general any polar compound in which the reactants are sufficiently soluble. It may be preferable in some cases to employ a solvent having a high boiling point such that pressure vessels are not required in order to obtain the operative reaction temperatures. Suitable high-boiling solvents include for example the aliphatic sulfones such as methyl-ethyl sulfone, diethyl sulfone, diethanol amine, diethylene glycol and the like. Another class of high boiling solvents consists of the substituted aromatic compounds which contain one or more electron-withdrawing functional groups attached directly to the ring, thereby inactivating the ring hydrogens and thus preventing mercuration of the ring by the mercuric chloride. Examples of such electron-withdrawing groups include aldehyde —CHO, ketone —COR, carboxyl —COOR, nitro —$NO_2$, nitrile —CN, amide —$CONH_2$, sufonate —$SO_3R$, sulfone —$SO_2R$, sufonyl halide —$SO_2X$ and similar substituents. Specific examples include for example nitrobenzene, benzonitrile, benzene sulfonic acid, benzoic acid, etc., and mixtures of such compounds. When non-aqueous solvents are employed it is apparently essential to provide traces of water in the reaction mixture, as by blowing with steam, or similar expedients.

During the first stage of the reaction, while carbon dioxide and HCl are being evolved, those gaseous materials are ordinarily continuously withdrawn from the reaction vessel, although part of the HCl may remain dissolved in the reaction mixture. An inert sweep-gas such as nitrogen may be employed to facilitate the removal of $CO_2$ and HCl as the latter are formed. Reaction III may be partially initiated by the HCl which is present in the first stage. The completion of Reaction IV however ordinarily requires a considerable excess of HCl.

It is feasible in most cases to perform the second stage of the reaction in the same solvent medium employed in the first stage. This is permissible for example when water is employed, in which case the insoluble solid material remaining after the first stage is predominantly mercurated terephthalic acid derivatives, which may be segregated and treated separately in the hydrochlorinolysis step. The remaining mother liquor from the first stage may be separately treated to produce predominantly isophthalic acid. In any case the mercuric chloride which is regenerated upon hydrochlorinolysis is recovered either as mother liquor or by aqueous extraction and washing, and is then recycled to the first stage of the process. Ordinarily there is no loss of mercuric chloride. In a sense therefore the mercuric chloride may be considered as a catalytic agent.

In addition to water, any of the other solvents mentioned above for the first stage may also be employed in the second stage. If complete solution of the reactants in the second stage is not attained, agitation and elevated temperatures may be desirable to obtain a sufficiently rapid reaction rate. Agitation is preferred when water, and the aromatic solvents mentioned above, as well as aliphatic sulfones, are employed. When alcohols or glycols are employed in the second stage, and when those solvents are saturated or nearly saturated with HCl, the reactants are largely in solution and the reaction proceeds at a more rapid rate at lower temperatures. Moreover, the corresponding esters are simultaneously formed. Since the esters are ordinarily the products desired in industry, the use of alcohols in the second stage has a distinct advantage.

The reaction products from the second stage may be treated in a number of ways for recovering the product, the solvent, and the regenerated mercuric chloride. If the solvent employed in the second stage is the same as that of the first stage, the solvent plus the mercuric chloride may be separated from the dicarboxylic acids by filtration or other methods and recycled to the first stage without further separation. In cases where the dicarboxylic acids are soluble in the solvent, other separation methods may be employed, such for example as distillation to recover the solvent and water washing of the bottoms to recover the mercuric chloride. Those skilled in the art will readily understand that these and other recovery procedures are feasible, and the invention is not limited to such details.

While the process is described herein with specific reference to mercuric chloride, other mercuric salts may likewise be employed, for example mercuric bromide, mercuric iodide, mercuric acetate, mercuric nitrate, and the like. The preferred salts are the mercuric halides because those materials are largely non-ionized in aqueous solutions and hence favor the completion of Reactions IV and IVa. However the ionizable mercuric salts e. g. the nitrate or the acetate may be employed where non-ionizing reaction media are employed. Also, the ionizable mercuric salts may be employed in the first stage of the reaction regardless of the nature of the medium. The second stage of the reaction, involving Equations III and IV, is greatly facilitated by the use of a halogen acid, which produces a non-ionized mercuric salt. However, the use of other acids is feasible e. g. acetic acid or nitric acid, especially if non-ionizing media are employed.

The invention may perhaps be more readily understood from the following examples which are however illustrative only and not limitative.

*Example I*

About 105 gms. of trimellitic acid (0.5 mole) is dissolved in 2 liters of hot water, and 135 gms. of mercuric chloride (0.5 mole) is added with stirring. The mixture is then heated in a stainless steel pressure vessel at 225–235° C. The pressure vessel is equipped with an agitator and a relief valve, and gaseous $CO_2$ and HCl are continuously exhausted therefrom. After about 3 hours the evolution of $CO_2$ ceases, and the mixture is cooled to about 100° C. This first-stage reaction product then consists of an aqueous solution, together with a considerable amount of insoluble material. The insoluble material consists mainly of the chloromercuri and anhydro-hydroxymercuri derivatives of terephthalic acid. The corresponding mercuri derivatives of isophthalic acid remain largely in solution.

*Example II*

The total reaction product from Example I is then repressured with gaseous hydrogen chloride until about 12 moles of HCl have been admitted. The mixture is then heated at 190° C. for one hour. This second-stage reaction product is then cooled to about 40° C. and filtered. The filter cake is washed with cold water to remove $HgCl_2$ and the washings are combined with the filtrate. Analysis of the washed filter cake shows it to consist of about 61 gms. of terephthalic acid and 15 gms. of isophthalic acid. The over-all yield of dibasic acids is 91.6%, and the recovered conversion to terephthalic acid is 73.5%. The mercuric chloride is recovered quantitatively.

*Example III*

The total reaction product from Example I is filtered at 40° C., and the filter cake washed with cold water. The filtrate and washings are then evaporated to about half their volume, repressured with approximately 6 moles of hydrogen chloride, and heated at 190° C. for one hour. The reaction mixture is cooled to about 30° C. and filtered. The washed filtrate consists predominantly of isophthalic acid, representing about a 22% conversion of trimellitic acid.

The washed filter cake is then dried in an air stream and dissolved in a solution composed of 800 ml. methanol and about 190 gms. of anhydrous HCl. The solution is heated at 60° C. for 30 minutes, and the methanol and HCl are then recovered by distillation at 60 mm. The solid residue is then washed three times with 500 ml. portions of water to remove the mercuric chloride. The remaining solid is then air dried and weighed. Sixty-eight grams of total product is recovered, of which 97% (66 gms.) is dimethyl terephthalate, the remainder being mostly dimethyl isophthalate. The mole-percent conversion of trimellitic acid to dimethyl terephthalate recovered is about 68%.

*Example IV*

About 42 gms. of trimellitic acid (0.2 mole) is dissolved in 200 ml. of nitrobenzene and 27 gms. of mercuric chloride (0.1 mole) is added. The mixture is then heated at atmospheric pressure and at 210° C. while blowing a mixture of steam and nitrogen therethrough. Evolution of $CO_2$ is vigorous at first, and ceases after about 3 hours, after which heating is discontinued. Dry hydrogen chloride is then bubbled through the mixture at a pot temperature of 170° C. and a pressure of 760 mm. for 10 minutes. The nitrobenzene is then distilled off under reduced pressure, and the remaining solid is exhaustively washed with cold water to remove the mercuric chloride and unconverted trimellitic acid. About 21 gms. of mixed dicarboxylic acids remain, of which about 78 mole-percent is terephthalic acid. These mixed acids may be separated for example by solvent extraction with a mixture of 85 volume percent methanol and 15 volume percent water, to selectively dissolve the isophthalic acid, as disclosed more specifically in my copending application Serial No. 321,049, filed November 17, 1952, now U. S. Patent No. 2,741,633. This solvent is particularly desirable for resolving mixtures which contain only minor proportions of isophthalic acid.

*Example V*

About 42 gms. of trimellitic acid (0.2 mole) is dissolved in 200 ml. of nitrobenzene and 27 gms. of mercuric chloride (0.1 mole) is added. The mixture is then heated at atmospheric pressure and at 210° C. while blowing a mixture of steam and nitrogen therethrough. Evolution of $CO_2$ is vigorous at first, and ceases after about 3 hours, after which heating is discontinued. 300 ml. of a 50 volume percent mixture of benzene and n-heptane is then added to the reaction mixture, causing a voluminous precipitation of solid material, which is filtered off and washed with additional quantities of the hydrocarbon mixture. The solid mixture of mercuri derivatives is then dissolved in 100 ml. of ethanol saturated with HCl, and the solution heated at 50° C. for 1 hour. The ethanol-HCl is then distilled off and the ester mixture is washed with water to remove $HgCl_2$. The mole-percent conversion to diethyl terephthalate is about 56%, which is recovered in pure state by fractional distillation of the mixture.

While in the above description and examples, a fairly sharp distinction is indicated between the first and second stages of the process, it should be clearly understood that this physical separation between the stages is the preferred modification only. It is entirely possible to conduct both stages simultaneously by simply maintaining a sufficient partial pressure of HCl, or other acid, throughout the reaction. This, however, ordinarily results in slowing up the reaction by inhibiting the first two steps thereof. It is therefore preferred to divide the process into two relatively distinct stages, the first wherein hydrogen chloride is continuously removed, and the second wherein an appreciable excess thereof is maintained in the mixture.

It should be understood also that when both stages of the reaction are conducted simultaneously, excess extraneous acid may or may not be added. The acid liberated by the formation of the anhydrohydroxymercuri intermediates will eventually decompose those intermediates to the dibasic acids, and excess acid merely hastens the decomposition.

The foregoing disclosure of this invention is not to be considered as limiting since many variations may be made by those skilled in the art without departing from the scope or spirit of the following claims.

I claim:

1. A process for decarboxylating trimellitic acid to form predominantly terephthalic acid which comprises dissolving trimellitic acid and a mercuric halide in an inert mutual solvent, heating the resulting solution in a first reaction stage in the presence of water at between about 100° and 350° C. while continuously withdrawing carbon dioxide and hydrogen halide to thereby effect decarboxylation and the formation of a mercuri derivative of terepthalic acid, subsequently reacting said mercuri derivative with excess hydrogen halide in a subsequent reaction stage at between about 25° and 300° C. to thereby effect hydrohalogenolysis of said mercuri derivative resulting in the formation of terephthalic acid, and recovering terephthalic acid from the reaction mixture.

2. A process for preparing an ester of terephthalic acid which comprises dissolving trimellitic acid and a mercuric halide in an inert first solvent, heating the resulting solution in a first reaction stage in the presence of water at between about 100° and 350° C. while continuously withdrawing carbon dioxide and hydrogen halide to thereby effect decarboxylation and the formation of a mercuri derivative of terephthalic acid, subsequently dissolving said mercuri derivative in a second solvent consisting essentially of a lower aliphatic alcohol plus hydrogen halide and heating the solution at a temperature between about 25° and 300° C. to effect hydrohalogenolysis of said mercuri derivative and simultaneous esterification, and thereafter recovering an ester of terephthalic acid from the reaction mixture.

3. A process as defined in claim 2 wherein said first solvent is essentially water.

4. A process as defined in claim 2 wherein said first solvent is a high boiling organic compound substantially immune to mercuration.

5. A process as defined in claim 2 wherein said mercuric halide is mercuric chloride and said hydrogen halide is hydrogen chloride.

6. A process for decarboxylating trimellitic acid to form predominantly terephthalic acid which comprises first dissolving trimellitic acid and a mercuric halide in an aqueous solvent, heating the resulting solution in a first reaction stage at between about 100° and 350° C. while continuously removing carbon dioxide and hydrogen halide to thereby effect decarboxylation and the formation of a relatively insoluble mercuri-derivative of terephthalic acid and a relatively soluble mercuri-derivative of isophthalic acid, separating the solid mercuri-terephthalic derivative from the mother liquor, and treating the segregated mercuri-terephthalic acid derivative in a second reaction stage at between about 25° and 300° C. with an excess of hydrogen halide to effect hydrohalogenolysis, and recovering substantially pure terephthalic acid from the second stage reaction products.

7. A process as defined in claim 6 wherein said mother liquor is subjected to treatment with an excess of hydrogen halide in a second reaction stage to effect hydrohalogenolysis of said mercuri-isophthalic acid derivative, and recovering substantially pure isophthalic acid from the second stage reaction mixture.

8. A process as defined in claim 6 wherein said mercuric halide is mercuric chloride and said hydrogen halide is hydrogen chloride.

9. A process for preparing an ester of terephthalic acid which comprises first dissolving trimellitic acid and a mercuric halide in an aqueous solvent, heating the resulting solution in a first reaction stage at between about 100° and 350° C. while continuously removing carbon dioxide and hydrogen halide to thereby effect decarboxylation and the formation of a relatively insoluble mercuri-derivative of terephthalic acid and a relatively soluble mercuri-derivative of isophthalic acid, separating the solid mercuri-terephthalic derivative from the mother liquor, and treating the segregated mercuri-terephthalic acid derivative in a second reaction stage at between about 25° and 300° C. with an excess of hydrogen halide and an aliphatic alcohol to effect concurrent hydrohalogenolysis and esterification, and recovering substantially pure terephthalic acid ester from the second stage reaction products.

10. A process as defined in claim 9 wherein said mercuric halide is mercuric chloride, and said hydrogen halide is hydrogen chloride.

11. A cyclic process for decarboxylating trimellitic acid to form predominantly terephthalic acid which comprises dissolving trimellitic acid and a mercuric halide in an inert mutual solvent, heating the resulting solution in a first reaction stage in the presence of water at between about 100° and 350° C. while continuously withdrawing carbon dioxide and hydrogen halide to thereby form a mercuri derivative of terephthalic acid, subsequently reacting said mercuri derivative with excess hydrogen halide at a temperature between about 25° and 300° C. in the presence of said mutual solvent in a subsequent reaction stage to effect hydrohalogenolysis of said mercuri derivative resulting in the formation of terephthalic acid and mercuric halide, separating said terephthalic acid from the final reaction mixture, removing excess hydrogen halide from said reaction mixture, and recycling the residual solution of mercuric halide and solvent to said first reaction stage.

12. A process as defined in claim 11 wherein said mutual solvent is essentially water.

13. A method for preparing terephthalic acid which comprises heating trimellitic acid in intimate admixture with mercuric chloride, water, and hydrogen chloride at a temperature between about 100° and 350° C., thereby forming predominantly terephthalic acid, and recovering terephthalic acid from the reaction mixture.

References Cited in the file of this patent

Leuck et al.: J. A. C. S., vol. 51, pp. 1831–6 (1929).
Whitmore et al.: J. A. C. S., vol. 51, pp. 602–605, 3352–3 (1929).